(12) United States Patent
Ardes

(10) Patent No.: US 7,069,900 B2
(45) Date of Patent: Jul. 4, 2006

(54) MODULE FOR AN INTERNAL COMBUSTION ENGINE

(75) Inventor: Wilhelm Ardes, Ascheberg (DE)

(73) Assignee: Hengst GmbH & Co., KG, Munster (DE)

( * ) Notice: Subject to any disclaimer, the term of this patent is extended or adjusted under 35 U.S.C. 154(b) by 22 days.

(21) Appl. No.: 10/889,862

(22) Filed: Jul. 13, 2004

(65) Prior Publication Data

US 2005/0011504 A1    Jan. 20, 2005

(30) Foreign Application Priority Data

Jul. 14, 2003    (DE)    ........................... 203 10 841 U

(51) Int. Cl.
   *F01M 11/03*    (2006.01)
(52) U.S. Cl. .................................. 123/196 R
(58) Field of Classification Search ............ 123/196 R, 123/196 A, 196 CP, 196 AB
   See application file for complete search history.

(56) References Cited

U.S. PATENT DOCUMENTS 6,058,899 A  * 5/2000 Schetter .................. 123/196 A
6,491,556 B1 * 12/2002 Muramatsu et al. ...... 440/88 R
6,517,710 B1 * 2/2003 Hartmann et al. .......... 210/168
6,530,356 B1 * 3/2003 Inoue et al. ............ 123/196 R
6,591,819 B1 * 7/2003 Tscherne et al. ............ 123/572
6,620,007 B1 * 9/2003 Kinomoto ................. 440/88 L
6,638,123 B1 * 10/2003 Kinomoto ................. 440/88 L
6,761,142 B1 * 7/2004 Suzuki et al. ........... 123/196 R

* cited by examiner

*Primary Examiner*—Henry C. Yuen
*Assistant Examiner*—Jason Benton
(74) *Attorney, Agent, or Firm*—Sonnenschein Hath & Rosenthal, LLP

(57) ABSTRACT

A module for an internal combustion engine formed as a unit comprising an oil filter for lubricating oil of the engine and an oil separator for crankcase ventilation gas and which, as a whole, is attached to the engine by a flange connection with flow connections. An oil duct for oil to be filtered and an oil duct for filtered oil extend through the flange. A ventilation duct for ventilation gas and an oil return duct for separated oil also extent through the flange. A drain duct connected to the crankcase via the flange connection is provided for draining the oil filter upon a replacement of the filter element. The drain duct, the ventilation duct and the oil return duct are united in the flange connection and along at least a part of their length in the module in a single combined gas-and-oil duct.

21 Claims, 6 Drawing Sheets

MODULE FOR AN INTERNAL COMBUSTION ENGINE

BACKGROUND OF THE INVENTION

The present invention relates to a module for an internal combustion engine containing an oil filter.

Modules for internal combustion engines which comprise and, in a spatially compact manner, accommodate various ancillary aggregates and components of the internal combustion engine are known from the state-of-the-art.

EP 0 898 060 B1 describes an oil module for internal combustion engines. Therein, it is provided that this known module is formed as a single structural unit comprising an oil filter, an oil cooler and a ventilation system with oil separator and that the module, as a whole, is flanged to the internal combustion engine. The crankcase ventilation gas flows out of the crankcase and into the oil separator via a transfer cross-section that is integrated in the flange connection, with the oil contained in the crankcase ventilation gas being separated from the oil in said oil separator. The separated oil is returned to the oil pan via its own oil return duct. Hence, this module requires a separate gas duct and a separate oil return duct.

In principle, it is known to provide automatic drainage of oil filters for internal combustion engines on replacement of the filter element. The oil filter of the module according to EP 0 898 060 B1 has the disadvantage that such an automatic drainage is not provided therein.

What is also known in this module from EP 0 898 060 B1, is that cooling water is supplied from the internal combustion engine, through the flange connection and into the oil cooler and, after having flown through the oil cooler, is then returned to the internal combustion engine. As regards the cooling water, the module does not assume any functions here, with the exception of the function of cooling the oil.

SUMMARY OF THE INVENTION

The present invention aims at creating modules of the aforementioned type, which obviate the drawbacks disclosed and which, on the one hand, fulfill as great a number of functions as possible with as small a number of ducts to be connected in the flange connection and/or which, on the other hand, provide additional functions in order to reach an even higher degree of integration.

In a first embodiment, this problem is solved by the invention by means of a module formed as a structural unit comprising at least one oil filter for lubricating oil of the internal combustion engine and one oil separator for crankcase ventilation gas of the internal combustion engine. The modules as a whole, is connected to the internal combustion engine by means of a flange connection between a module flange and an engine flange with flow connections being established. An oil duct for oil to be filtered runs from the internal combustion engine to the oil filter and an oil duct for filtered oil runs from the oil filter to the internal combustion engine. A ventilation duct for crankcase ventilation gas runs from the crankcase of the internal combustion engine to the oil separator. An oil return duct for separated oil runs from the oil separator to the crankcase of the internal combustion engine. A drainage duct is provided in the module for draining the oil filter upon replacement of the filter element, this drainage duct being connected to the crankcase of the internal combustion engine via the flange connection. The drainage duct, the ventilation duct and the oil return duct are united to a single combined gas-and-oil duct in the flange connection and along at least a part of their length in the module.

In this first module according to the invention, it is possible to accomplish a small number of ducts to be connected in the flange connection, because the combined gas-and-oil duct assumes the function of three conventional ducts. During operation of the internal combustion engine, the crankcase ventilation gases flow out of the crankcase and into the oil separator through the combined gas-and-oil duct. Depending on the construction of the oil separator, the oil separated in the oil separator can be returned from the oil separator to the crankcase and to the oil pan through the same gas-and-oil duct, either continuously during operation of the internal combustion engine or discontinuously during stoppages of the internal combustion engine. Furthermore, the combined gas-and-oil duct is used to discharge the oil filter upon replacement of the filter element and to drain the oil from the oil filter and into the oil pan. By comprising these various functions in the combined gas-and-oil duct, the number of ducts to be connected in the flange connection is fewer than in a conventional module with the same number of functions, this simplifying the production of the module and the flange connection of the module to the internal combustion engine. Therein, this simplification additionally reduces the cost of production of the internal combustion engine, because the number of ducts and, thus, the production efforts, are also reduced in the manufacture of the internal combustion engine.

In a further embodiment of the module, it is provided that the module comprises an oil cooler for cooling the lubricating oil of the internal combustion engine by means of the latter's cooling water, that the oil cooler includes an oil drain to be enabled in case of an oil change and/or on replacement of the filter element, and that the oil drain ends in the combined gas-and-oil duct. In this embodiment, the module assumes the additional function of cooling the lubricating oil. Here, an additional duct is not required for draining the lubricating oil from the oil cooler in case of an oil change and/or upon replacement of the filter element, but the combined gas-and-oil duct that is otherwise available is also used for this purpose.

In order that external lines do not have to be placed to supply and discharge the cooling water to and from the oil cooler, it is furthermore provided that the module comprises one cooling water duct carrying cooling water from the internal combustion engine to the oil cooler and one cooling water duct carrying cooling water from the oil cooler to the internal combustion engine, both cooling water ducts running through the flange connection.

A further increase in the number of functions of the module according to the invention can be achieved in a further embodiment by the module comprising a lubricating oil inlet for filling lubricating oil after an oil change and for refilling lubricating oil into the internal combustion engine as required and by the lubricating oil inlet ending in the combined gas-and-oil duct. By assuming this additional function, the module has the advantage that it does not increase the number of ducts to be connected in the flange connection because the combined gas-and-oil duct that is already available is also used for this additional function.

After having been produced, modern internal combustion engines are filled with lubricating oil for the first time not via the usual lubricating oil inlet but via a special filling piece or filling connection. For that reason, a further embodiment of the module according to the invention proposes that the module comprises a filling piece or filling connection for filling the internal combustion engine with lubricating oil for the first time and that the filling piece or the filling connection ends in the combined gas-and-oil duct. This additional function does not require any additional duct in the region of the flange connection either, because the combined gas-and-oil duct that is already available is also used for transferring the lubricating oil when the internal combustion engine is filled for the first time.

To ensure smooth operation of the internal combustion engine, it is essential that the pressure in the crankcase is kept within specified limit values. Usually, at least one pressure regulating valve ensuring pressure control in the crankcase is used to achieve this. According to the invention, it is provided that the module comprises a pressure regulating valve for controlling the pressure present in the crankcase, the pressure regulating valve being positioned in the flow path of the crankcase ventilation gas that is cleaned in the oil separator. Since the crankcase ventilation gas is, at any rate, supplied from the internal combustion engine into the module, the additional integration of the pressure regulating valve in the module does not cause an increase in the number of ducts to be connected in the flange connection either.

In a further embodiment of the module that was the last to be described above, it is provided that the pressure regulating valve is placed on the oil separator and comprises a line connection for a gas line running to an intake section of the internal combustion engine, said gas line being provided for the crankcase ventilation gas deoiled in the oil separator. In this embodiment, the pressure regulating valve can be accommodated in a space-saving manner; it is only necessary to connect a line running to the intake section of the internal combustion engine to the pressure regulating valve, said line allowing the cleaned crankcase ventilation gas to flow to the intake section of the internal combustion engine. Therein, the pressure regulating valve controls the flow and, at the same time, the pressure in the crankcase.

In a further embodiment, the aforementioned problem is solved by the invention by means of a module formed as a structural unit comprising at least one oil filter for lubricating oil of the internal combustion engine and one oil cooler for cooling the lubricating oil by means of cooling water of the internal combustion engine. The module, as a whole, is connected to the internal combustion engine by means of a flange connection between a module flange and an engine flange with flow connections being established. An oil duct for oil to be filtered runs from the internal combustion engine to the oil filter and an oil duct for filtered oil runs from the oil filter to the internal combustion engine. A first cooling water duct runs from the internal combustion engine to the oil cooler. A second cooling water duct runs from the oil cooler to the internal combustion engine. The module comprises at least one control element directing the cooling water to different flow paths of the cooling water circuit. At least one additional cooling water duct that is connected to at least one of the cooling water ducts and supplies cooling water to or from the control element is provided in the module.

Assuming that the module comprises at least one oil filter and at least one oil cooler, additional functions involving direction of the cooling water are integrated in the module in this solution. To cool the oil in the oil cooler inside the module, cooling water is already supplied from the internal combustion engine to the oil cooler and, after the oil has been cooled, back to the internal combustion engine, so that cooling water flows through the module in any case. In the second module according to the invention, the additionally integrated function is implemented by at least one control element which affects the flow of the cooling water in the cooling water circuit, depending on the operating state of the internal combustion engine, by directing the cooling water to different flow paths or by dividing the cooling water to different flow paths at a variable and changeable ratio. Since a first duct for supplying the cooling water to the module and a second duct for returning the cooling water from the module to the internal combustion engine are already available, the additional integration of the control element, in the minimum case, only causes the requirement of a further duct, for example if the control element divides the cooling water flow into two flow paths. This increases the additional requirements for the water management of the module only to a minor degree, wherein a considerable gain in functionality is, nevertheless, obtained at the same time.

In order to avoid lines that are externally connected to the module in an expensive manner, it is preferably provided that at least one additional cooling water duct that is in fluid communication with the control element extends through the flange connection.

In a further embodiment of the above second module according to the invention, it is provided that the control element comprises a thermostat valve directing the cooling water, depending on its temperature, either into a small cooling circuit while bypassing a cooling unit cooling the cooling water or into a large cooling circuit with the cooling water flowing through the cooling unit cooling the cooling water.

As an alternative or in addition, it can furthermore be provided that the control element comprises an adjustable flow divider that, depending on the particular cooling requirements on the side of the internal combustion engine, divides the cooling water coming from the latter's cylinder head and from the latter's crankcase into a cooling water flow path predominantly cooling the cylinder head and a cooling water flow path predominantly cooling the crankcase. In this embodiment, the module forms a part of what is called a "split cooling" system.

A further function of the module according to the second solution can be achieved by providing a water connection at the module, the water connection being provided for a heating that can be operated with heated cooling water, in particular an interior heating of a vehicle. By connecting the heating to the module, it is often possible to achieve shorter flow paths and shorter lines required to that end as well as to simplify mounting, because the module is often accessible more easily than, for example, the engine block of the internal combustion engine.

For all modules according to the invention described above, it is preferably provided that the ducts extending through the flange connection are sealed against each other and against their environment by means of axially sealing sealants. Axially sealing sealants permit the flanges of the flange connection to be held in a relatively simple manner both on the side of the module and on the side of the internal combustion engine, this contributing to low production costs on either side.

In a further embodiment, the sealants of the flange connection are, therein, preferably attached to the module-sided flange. Since, in relation to the remaining internal combustion engine, the module is a relatively small and light component, the sealants, after having been pre-attached to the module, are subject to a lower risk of being damaged than would be the case if the sealants were pre-attached to the internal combustion engine, until establishment of the flange connection.

To simplify the establishment of the flange connection even further, the invention proposes that the sealants be formed by a single, one-piece sectional seal. This prevents sources of faults from occurring during mounting, which would be caused by several small seals having to be attached in the region of the flange connection.

To prevent the sealant or the sealants at the module from getting lost unintentionally or leaving their rated position unintentionally, thus causing leaks, it is finally provided according to the invention that the sealant or the sealants is/are placed or clamped or glued or molded in one or more mounting grooves in the module-sided flange.

According to an alternative embodiment, it is provided that the flange connection is designed flatly on either side and that the sealant is a one-piece flat seal.

All embodiments of the modules according to the invention help to achieve the various benefits either separately or jointly. In particular, the number of ducts in the flange connection can be minimized, this resulting in a corresponding reduction of sealing points and leakage risks as well as in reduced cost. At the same time, the particularly compact design helps to save weight and gain additional space that can be used to accommodate or attach further components of the internal combustion engine. For example, a generator or an air-conditioning compressor can, as an attached part, be connected to the module via holders provided with strengthening ribs and formed to fit to the module. In general, the modules permit the achievement of a greater freedom in designing the engine compartments of modern vehicles, although the space in said engine compartments is becoming increasingly smaller.

BRIEF DESCRIPTION OF THE DRAWING

Executive examples of modules according to the invention will be illustrated below by means of a drawing, in which.

DETAILED DESCRIPTION OF THE PREFERRED EMBODIMENT

Figure 1:
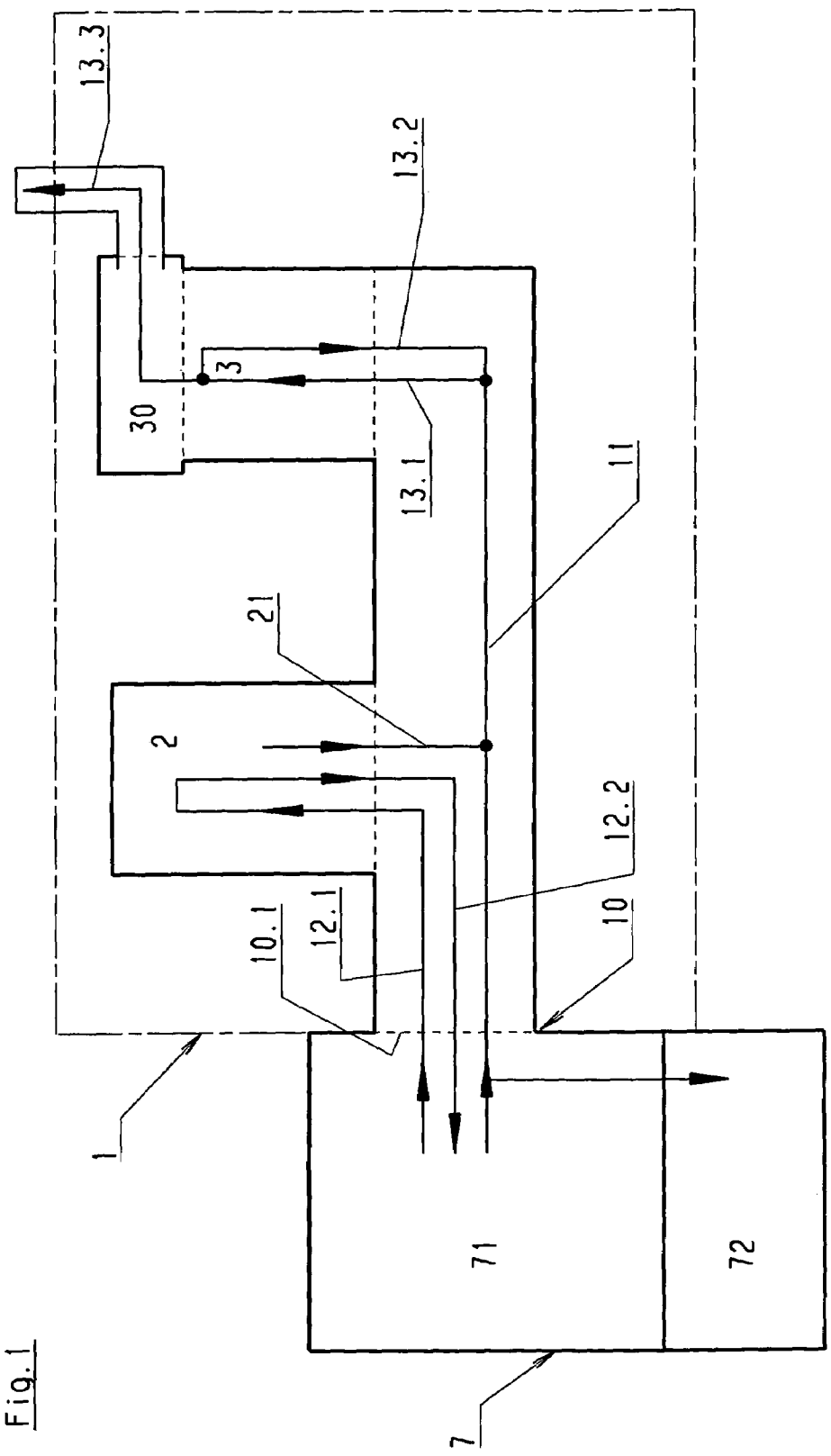
FIG. 1 is a schematic representation of a first module together with an internal combustion engine.

To its left, FIG. 1 shows only a schematic representation of an internal combustion engine 7, to the right of which a module 1 is attached by means of a flange connection 10.

At its top, the drawing only shows the crankcase 71 and, below that, the oil pan 72 of the internal combustion engine 7. The further parts of the internal combustion engine 7 are not visible here.

The module 1 according to FIG. 1 comprises an oil filter 2 and an oil separator 3. Lubricating oil to be purified and supplied from the internal combustion engine 7 through a crude-oil duct 12.1 is filtered in the oil filter 2. From the oil filter 2, the filtered oil flows through a purified-oil duct 12.2 back to the internal combustion engine 7.

An automatic drainage of the oil filter 2 is provided for a replacement of the filter element of the oil filter 2; to achieve this, the oil filter 2 comprises a drainage duct 21. The drainage duct 21 is opened automatically if the filter element is removed from the oil filter 2. The oil flows out of the oil filter 2 and through the drainage duct 21 by virtue of gravity. The drainage duct 21 ends in a duct 11 extending through the module 1 and running to the internal combustion engine 7.

In the region of the flange connection 10, the ducts 11, 12.1 and 12.2 are connected to the corresponding ducts of the internal combustion engine 7.

On the side of the internal combustion engine 7, the duct 11 is connected to the latter's crankcase 71, so that crankcase ventilation gas can flow through the duct 111 to the oil separator 3. Near the end of the duct 11, the crankcase ventilation gas is passed into the oil separator 3 via a ventilation duct 13.1. Any oil that is carried along in the crankcase ventilation gas in the form of oil mist and oil droplets is separated in the oil separator 3. The separated oil is passed into an oil return duct 13.2 that is running from the oil separator 3 back into the duct 11. The oil separated in the oil separator 3 is discharged into the oil return duct 13.2 and, from there, into the combined gas-and-oil duct 11, either continuously during operation of the internal combustion engine or discontinuously during stoppages of the internal combustion engine. The separated oil flows through the duct 11 to the internal combustion engine 7 and, there, into the latter's oil pan 72.

Hence, the combined gas-and-oil duct 11 fulfills three functions in the module, as shown in FIG. 1. It serves to discharge the oil when the oil filter 2 is drained on replacement of the filter element; it serves to supply the crankcase ventilation gas to the oil separator 3; and it serves to return the oil separated in the oil separator 3 to the internal combustion engine 7.

The crankcase ventilation gas that has been cleaned and freed from oil in the oil separator 3 is supplied to a connection 13.3 provided on the module 1 and outside of the flange connection, said connection 13.3 being connected or being able of being connected to an intake section of the internal combustion engine 7. For example, a tube connection can be used to achieve this.

As shown in FIG. 1, a pressure regulating valve 30 is, in addition, integrated in the module 1, in order to maintain a specified crankcase gas pressure in the crankcase 71 of the internal combustion engine 7. Here, the pressure regulating valve 30 is placed on the oil separator 3 and is arranged in the flow path of the cleaned crankcase ventilation gas from the oil separator 3 to the connection 13.3.

Figure 2:
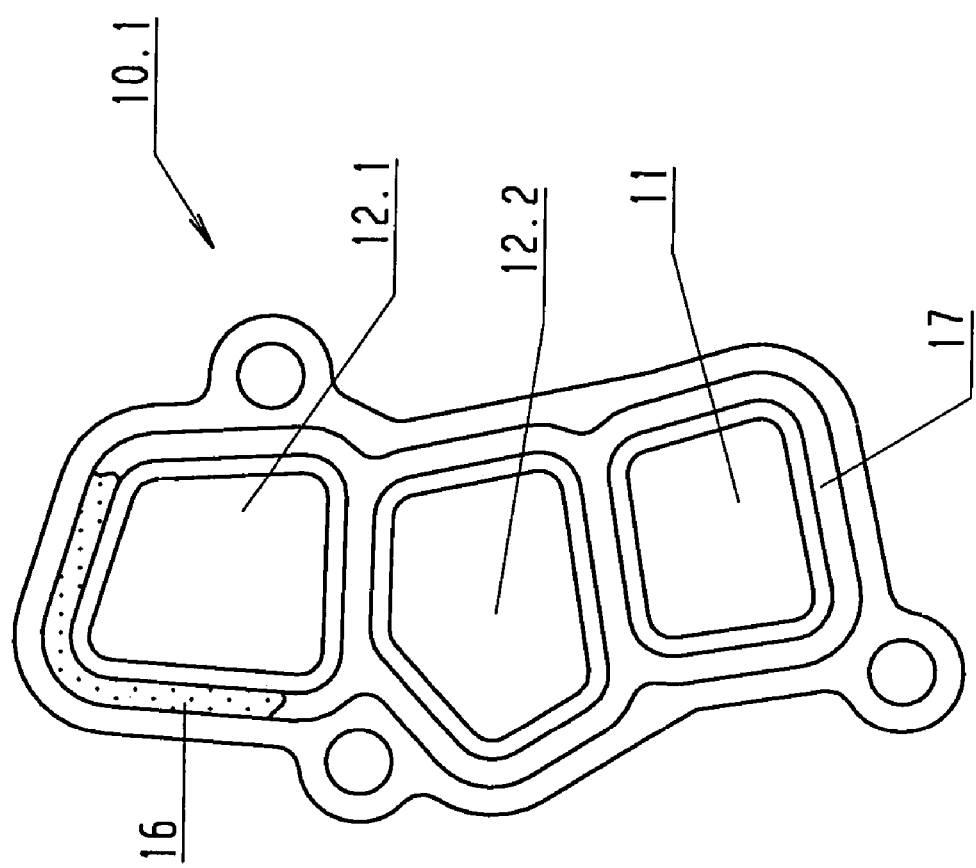
FIG. 2 is an elevational view of the connection flange of the module of FIG. 1.

FIG. 2 shows an elevational view of the module-sided flange 10.1 of the flange connection 10 according to FIG. 1. As has already been illustrated in FIG. 1, the flange connection comprises a total of three ducts there. These three ducts are also shown in the top view of the flange 10.1 in FIG. 1. The duct 12.1 is the crude-oil duct through which oil that is contaminated by the internal combustion engine 7 and that has to be filtered is passed to the oil filter 2. The duct 12.2 returns the lubricating oil filtered in the filter 2 back to the internal combustion engine 7 and the lubricating points thereof.

The duct 11 of the flange 10.1 is the combined gas-and-oil duct that serves to return lubricating oil when the oil filter 2 is drained on replacement of the filter element; to return the oil that has, in the oil separator 3, been separated from the crankcase ventilation gas; and, in the opposite flow direction, to supply the crankcase ventilation gas from the crankcase 71 of the internal combustion engine 7 to the oil separator 3.

Since the filter element of the oil filter 2 can be replaced only during a stop of the internal combustion engine 7, crankcase ventilation gas is prevented from flowing through the combined gas-and-oil duct 11 at the same time when the oil filter 2 is drained, so that mutual disturbances are avoided. Depending on the design of the oil separator 3, the lubricating oil can be returned from the oil separator 3 either continuously during operation of the internal combustion engine or discontinuously during stoppages of the internal combustion engine. If the oil is returned continuously, the oil that is coming from the oil separator 3 flows towards the internal combustion engine 7 and, there, into the latter's oil pan 72. In the countercurrent thereto, the crankcase ventilation gas flows through the same gas-and-oil duct 11 from the crankcase 71 to the oil separator 3. To prevent the two flows from mutually disturbing each other in case they are occurring at the same time, the combined gas-and-oil duct 11 is appropriately provided with a correspondingly large cross-section, so that the developing flow velocities of the crankcase ventilation gas are only relatively low and do not cause the oil separated in the oil separator 3 to be entrained in a direction opposite to the provided oil flow direction. This problem can be completely avoided by discontinuously draining the oil separated in the oil separator 3 and passing it into the duct 11 only during stoppages of the internal combustion engine by means of an appropriate valve.

Although the module 1 according to FIG. 1 assumes the functions of filtering the lubricating oil; of draining the oil filter on replacement of the filter element; of ventilating the crankcase 71; of separating and returning oil from the crankcase ventilation gas; and of controlling the pressure in the crankcase 71, only three ducts that are required for fulfilling all functions in the region of the flange connection must be connected to each other. In addition, only the external flow connection has still to be connected to the connection 13.3 of the module 1 (cf. FIG. 1).

Figure 3:
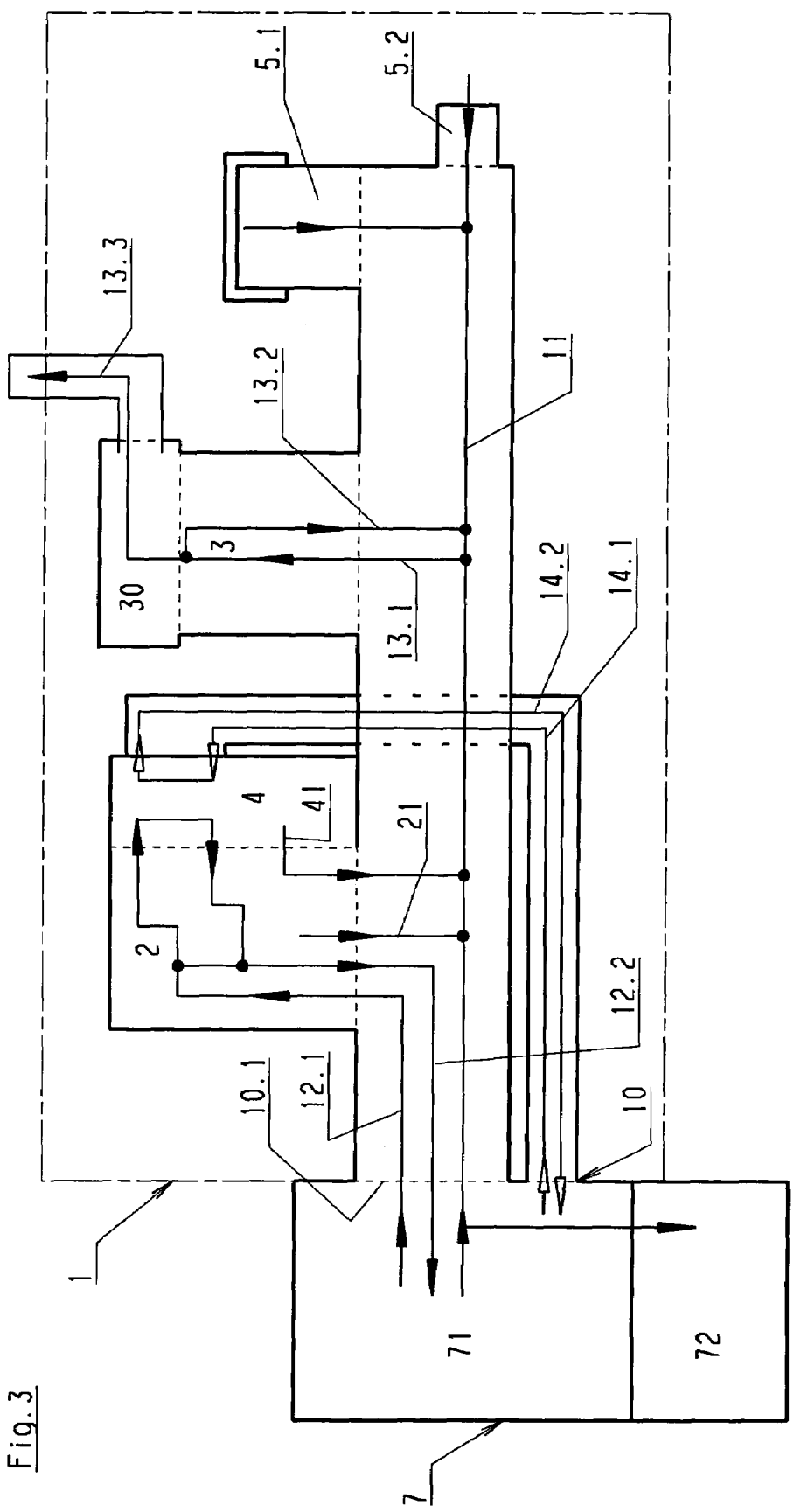
FIG. 3 is a schematic representation of a second embodiment of a module together with an internal combustion engine.

FIG. 3 shows a schematic representation of a second embodiment of the module 1. Contrary to the example shown in FIG. 1, the module 1 shown in FIG. 3 additionally comprises an oil cooler 4, a lubricating oil inlet 5.1, and a lubricating oil filling connection 5.2.

The oil cooler 4 is attached to the oil filter 2. Depending on the temperature of the lubricating oil, a more or less large portion of the lubricating oil flowing through the oil filter 2 is additionally passed through the oil cooler 4. The oil to be filtered and, if necessary, also cooled first flows from the internal combustion engine 7 through the crude-oil duct 12.1 and into the oil filter 2 and then, if necessary, into the oil cooler 4. The oil that has been filtered and, if necessary, also cooled flows from the oil filter 2 and the oil cooler 4 through the purified-oil duct 12.2 and back to the internal combustion engine 7.

Cooling water from the cooling water circuit of the internal combustion engine 7 is used to cool the lubricating oil in the oil cooler 4. In order to supply cooling water to the oil cooler 4 and back to the internal combustion engine 7 without any external line connections, the module 1, here, comprises two more ducts, that are a first cooling water duct 14.1 extending from the internal combustion engine 7 through the flange connection 10 and to the oil cooler 4 and a second cooling water duct 14.2 extending from the oil cooler 4 through the flange connection 10 and back to the internal combustion engine 7. Hence, integration of the oil cooler 4 in the module 1 only increases the number of ducts in the flange connection by two more ducts, this keeping extra expenditure within tolerable limits. To supply the lubricating oil to the oil cooler 4 and to discharge the lubricating oil from the oil cooler 4, ducts that are formed inside the module 1 are required only between the oil filter 2 and the oil cooler 4, said ducts not extending through the flange connection 10.

In the module 1 according to FIG. 3, an additional oil drain 41 is, furthermore, provided at the oil cooler 4. This oil drain 41 serves to discharge the lubricating oil that is also present in the oil cooler 4 in case of an oil change, in order to ensure that the lubricating oil is replaced as completely as possible in case of an oil change. The oil drain 41 can either be opened manually, or automatically by replacing the filter element. Inside the module 1, the oil drain 41 is connected to the combined gas-and-oil duct 11. Hence, the combined gas-and-oil duct 11 here assumes a further function, that is discharging lubricating oil from the oil cooler 4 without this additional function causing an increase in the number of ducts in the flange connection 10.

The lubricating oil inlet 5.1 serves to refill lubricating oil and to fill the internal combustion engine with lubricating oil in case of an oil change, as required. Inside the module 1, the lubricating oil inlet 5.1 is connected to the combined gas-and-oil duct 11. Furthermore, the module 1 is provided with the filling piece or filling connection 5.2 that serves to fill the internal combustion engine 7 with lubricating oil for the first time and also ends in the combined gas-and-oil duct 11. In the module 1 shown in FIG. 3, the combined gas-and-oil duct 11 is, hence, also used for two additional functions besides the functions already illustrated in FIG. 1. Hence, integration of the lubricating oil inlet 5.1 and the filling piece or filling connection 5.2 in the module 1 do not, in this case, cause an increase in the number of ducts inside the flange connection 10 either.

In its further functions, in particular with regard to the oil separator 3 and the associated pressure regulating valve 30, the module 1 shown in FIG. 3 corresponds to the embodiment shown in FIG. 1. Despite its considerably increased number of functions as compared with the example shown in FIG. 1, the module shown in FIG. 3 requires only two additional cooling water ducts to be connected to the internal combustion engine, so that only five ducts must be connected in the flange connection 10 in case of the module 1 shown in FIG. 3. With the exception of the line running from the connection 13.3 to the intake section, external line connections are not required.

Figure 4:
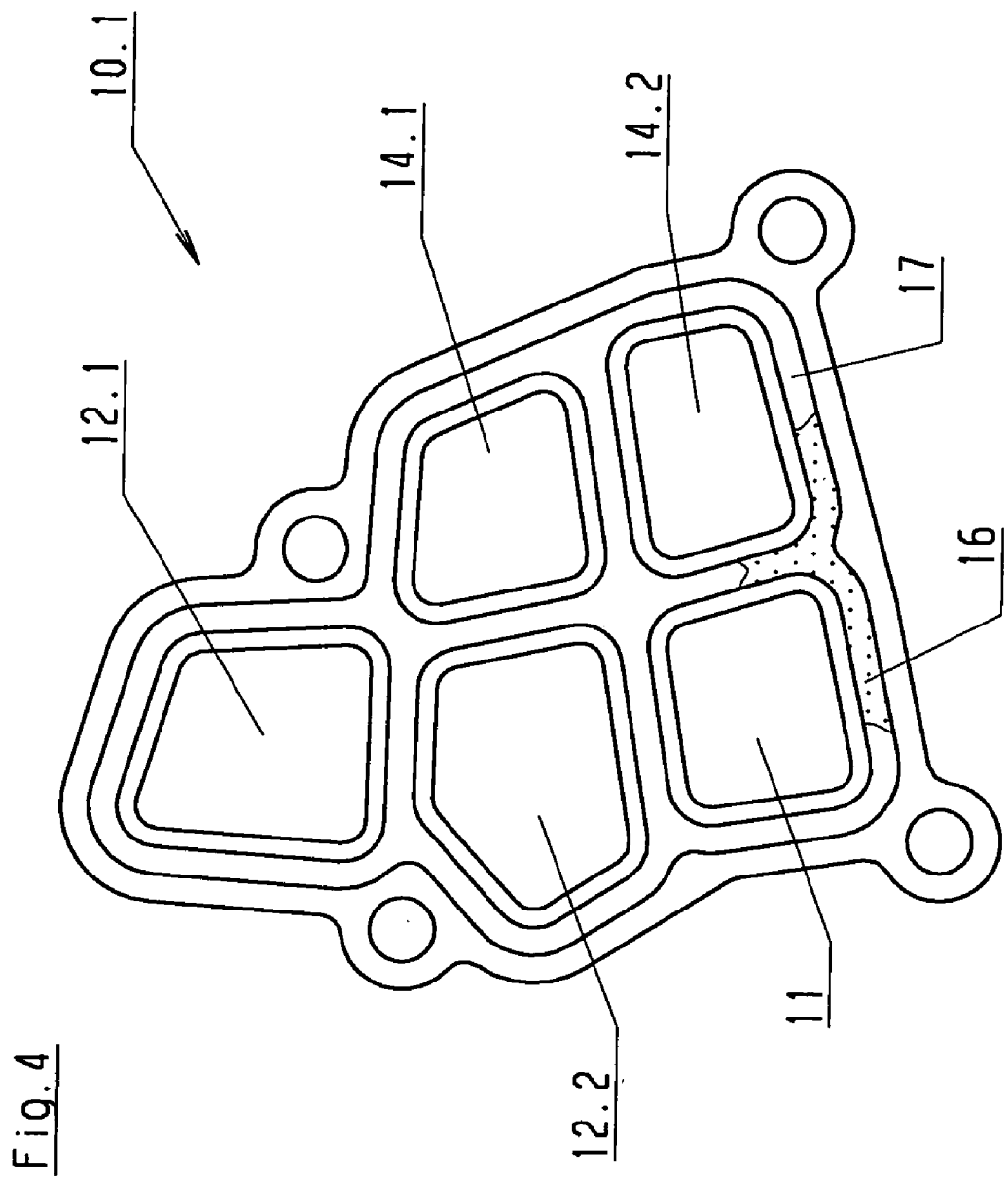
FIG. 4 is an elevational view of the connection flange of the module of FIG. 3.

FIG. 4 shows an elevational view of a possible embodiment of the module-sided flange 10.1 of the module 1 according to FIG. 3. As can be seen from FIG. 4, a total of five ducts are provided in the flange 10.1, corresponding to the appropriate ducts of the internal combustion engine 7 after the flange connection 10 has been established.

The duct 12.1 is the crude-oil duct, through which lubricating oil that is to be filtered and, depending on the temperature, is to be cooled can be passed to the oil filter 2 and, if necessary, to the oil cooler 4.

The duct 12.2 in the flange 10.1 is the purified-oil duct through which the lubricating oil that has been filtered and, if necessary, cooled is returned from the oil filter 2 and the oil cooler 4 back to the internal combustion engine 7.

The duct 11 is the combined gas-and-oil duct that fulfills a multitude of functions. On the one hand, the combined gas-and-oil duct 11 serves to return lubricating oil from the oil filter 2 and the oil cooler 4 to the internal combustion engine 7 on replacement of the filter element or in case of an oil change; to return to the internal combustion engine 7 the oil that has, in the oil separator 3, been separated from the crankcase ventilation gas; and to supply fresh lubricating oil that is filled through the lubricating oil inlet 5.1 in case of an oil change to the internal combustion engine 7. In the other direction, the combined gas-and-oil duct serves to discharge crankcase ventilation gas from the crankcase 71 of the combustion engine 7 to the oil separator 3.

The two further ducts 14.1 and 14.2 are cooling water ducts supplying cooling water from the internal combustion engine 7 to the oil cooler 4 and from the oil cooler 4 to the internal combustion engine 7.

Figure 5:
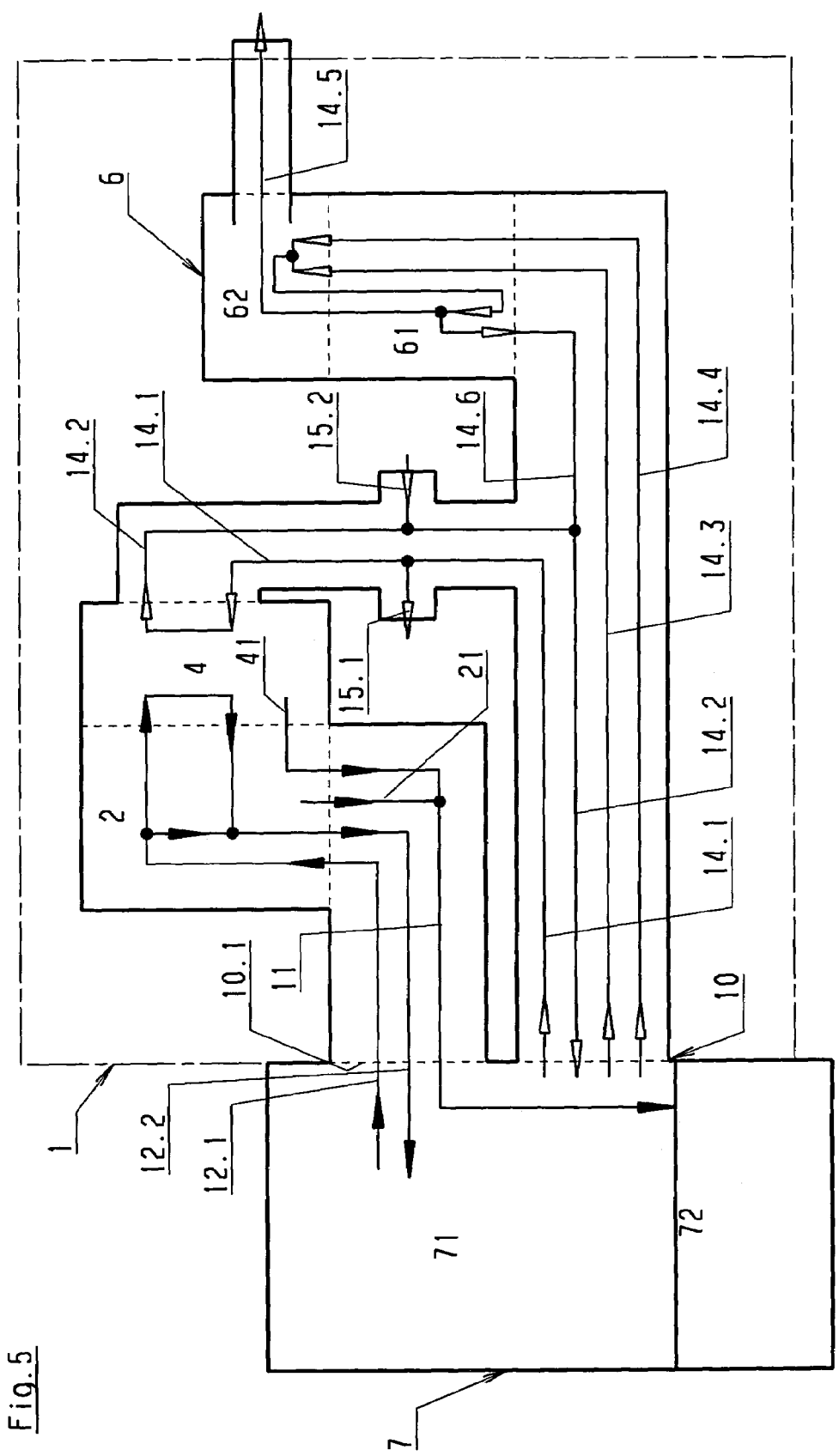
FIG. 5 is a schematic representation of a third embodiment of a module together with an internal combustion engine.

FIG. 5 of the drawing shows a schematic representation of a third embodiment of the module 1, wherein the module 1, here, comprises a control element component 6 affecting the cooling water flow, in addition to an oil filter 2 and an oil cooler 4.

From the internal combustion engine 7 and via the crude-oil duct 12.1, the oil filter 2 receives oil that is to be filtered. The oil that has been filtered in the oil filter 2 flows via the purified-oil duct 12.2 back to the internal combustion engine 7. Depending on the temperature of the oil flowing to the oil filter 2, a more or less large portion thereof is passed through the oil cooler 4 and cooled therein by means of cooling water. Here as well, the oil cooler 4 is assigned to the oil filter 2, so that the oil cooler 43, for supplying oil to and discharging oil from it, does not require any ducts in the region of the flange connection 10 in addition to the two oil ducts 12.1 and 12.2.

Here, the drainage duct 21 of the oil filter 2 and the oil drain duct 41 of the oil cooler 4 are used to drain the oil filter 2 on replacement of the filter element and to drain the oil cooler 4 in case of an oil change. The two ducts 21, 42 are combined inside the module 1 to form a common oil duct 11 that extends through the flange connection 10 to the oil pan 72 of the internal combustion engine 7.

The cooling water required for cooling the lubricating oil in the oil cooler 4 flows from the internal combustion engine 7 via a first cooling water duct 14.1 to the oil cooler 4; the cooling water exiting from the oil cooler 4 flows through the second cooling water duct 14.2 back to the internal combustion engine; both cooling water flows are passed through the flange connection 10.

In the module 1 shown in FIG. 5, a heater water connection 15.1 branches off from the first cooling water duct 14.1 in the latter's course from the flange connection 10 to the oil cooler 4, wherein said heater water connection 15.1 can be connected to the inflow branch of a heater, in particular of an interior heater of a vehicle comprising the internal combustion engine 7. Coming from the heater, the heater water can then be returned to the second cooling water duct 14.2 via the second heater water connection 15.2 that is provided between the oil cooler 4 and the flange connection 10.

In the example represented, the control element component 6 that is furthermore provided in the module 1 shown in FIG. 5 comprises two control elements, being a thermostat valve 61 and an adjustable flow divider 62.

Depending on the temperature of the cooling water, the thermostat valve 61 either serves to return the cooling water coming from the internal combustion engine 7 through a small cooling circuit directly to the internal combustion engine 7 while bypassing a cooling unit that cools the cooling water and is not shown in the drawing, or to pass the cooling water into a large cooling circuit while directing it through the cooling unit cooling the cooling water. To return the cooling water in the small-size cooling circuit, an internal cooling water duct 14.6 ending in the second cooling water duct 14.2 inside the module 1 is provided inside the module 1 between the thermostat valve 61 and the second cooling water duct 14.2 which, in turn, supplies the cooling water to the internal combustion engine 7.

The cooling water coming from the internal combustion engine 7 and having flowed through the internal combustion engine 7 to be cooled, flows via two cooling water ducts 14.3 and 14.4 from the internal combustion engine 7 through the flange connection 10 and to the control element component 6 and, in the latter case, to an adjustable flow divider 62. Therein, the cooling water duct 14.3 carries cooling water that has been used to cool a cylinder head of the internal combustion engine 7 that is not shown in the drawing, whereas the cooling water duct 14.4 carries cooling water that has been used to cool the crankcase of the internal combustion engine 7. Depending on the amount of thermal energy to be discharged in the region of the cylinder head and in the region of the crankcase 71 of the internal combustion engine 7, the adjustable flow divider 62 adjusts the flow in the two cooling water ducts 14.3 and 14.4 according to requirements. This type of divided cooling is generally known as a "split cooling" system.

Downstream of the adjustable flow divider 62, as seen in the flow direction, the two cooling water flows coming from the internal combustion engine 7 through the ducts 14.3 and 14.4 are combined in the module 1 and are jointly passed to the inlet of the aforementioned thermostat valve 61.

If the cooling water temperature is high, the thermostat valve 61 directs the cooling water to the large cooling circuit and through the cooling unit for the cooling water, as mentioned above, wherein a further cooling water duct 14.5 running to a connection of the module 1 positioned outside of the flange connection 10 is provided in module 1 to this end. A cooling water line running to the cooling unit for the cooling water can be connected to the connection end of the cooling water duct 14.5.

The crankcase ventilation function and the oil separation and pressure regulation functions provided to this end are not integrated in the module 1 shown in FIG. 5; but it is nevertheless possible to also include these functions in the module 1 shown in FIG. 5. Further ducts in the region of the flange connection 10 would not be necessary, because the duct 111 that is anyway available in the module 1 shown in FIG. 5 can be used for ventilating the crankcase. Hence, the flange connection 10 requires only seven ducts for the module 1 shown in FIG. 5 or even for the embodiment supplemented by the crankcase ventilation function, this being a low number with regard to the multitude of functions.

Figure 6:
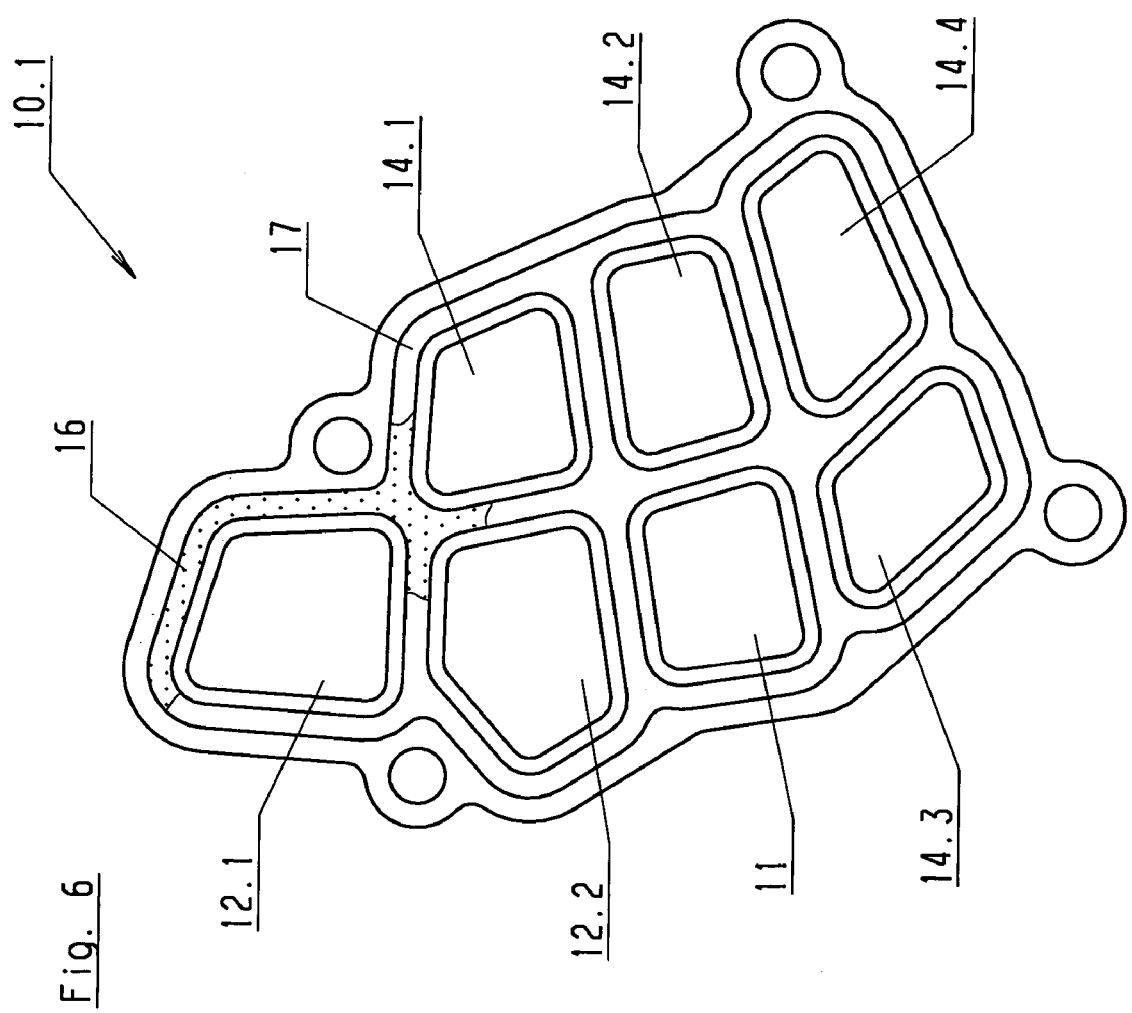
FIG. 6 is an elevational view of the connection flange of the module of FIG. 5.

FIG. 6 finally shows a view of the module-sided connection flange 10.1 of the module 1 shown in FIG. 6. As has been mentioned above, the flange connection to the flange 10.1 requires a total of seven ducts in this case. At its top, FIG. 6 shows the crude-oil duct 12.1 that supplies the lubricating oil that is coming from the internal combustion engine and is to be filtered and, if necessary, cooled to the oil filter 2 and to the oil cooler 4. Below that duct 12.1, the purified-oil duct 12.2 that returns the filtered and, if necessary, cooled lubricating oil to the internal combustion engine 7, is arranged. A first cooling water duct 14.1 supplying cooling water coming from the internal combustion engine to the oil cooler 4 is arranged to the right of the purified-oil duct 12.2. The second cooling water duct 14.2 is arranged below the duct 14.1. The duct 14.2 serves to return all cooling water flows from the module 1 to the internal combustion engine 7.

Two further cooling water ducts 14.3 and 14.4 that supply cooling water from the various regions of the internal combustion engine 7 to the module 1 are arranged at the bottommost area in the module-side flange 10.1. Therein, the cooling water duct 14.3 carries cooling water coming from the cylinder head of the internal combustion engine 7, whereas the duct 14.4 carries cooling water coming from the region of the crankcase of the internal combustion engine 7. As a result, the two cooling water ducts 14.3, 14.3 form parts of what is called a "split cooling" system. On the one hand, this cooling system permits selective and, in particular, varying and need-dependent cooling of the region of the cylinder head and, on the other hand, of the region of the crankcase 71 of the internal combustion engine 7.

Finally, the duct 11 that is, here, only serving to return lubricating oil to the internal combustion engine 7, from the oil filter 2 on replacement of the filter element and from the oil cooler 4 in case of an oil change, is also arranged in the module-sided flange 10.1 according to FIG. 6.

In all examples shown, a one-piece sectional seal 16 that is, in each case, inserted in a groove 17 formed, preferably, molded to fit appropriately is, here, used to seal the flange connection 10 and the individual ducts against each other as well as against the environment. As an alternative, the flange facing can also be formed absolutely flatly and can be sealed against the internal combustion engine 7 by means of a flat seal with the appropriate breakthroughs.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A module for an internal combustion engine, which module is formed as a structural unit comprising at least one oil filter for lubricating oil of the internal combustion engine and one oil separator for crankcase ventilation gas of the internal combustion engine and which, as a whole, is connected to the internal combustion engine by means of a flange connection between a module flange and an engine flange with flow connections being established, wherein an oil duct for oil to be filtered runs from the internal combustion engine to the oil filter and an oil duct for filtered oil runs from the oil filter to the internal combustion engine, wherein a ventilation duct for crankcase ventilation gas runs from the crankcase of the internal combustion engine to the oil separator and wherein an oil return duct for separated oil runs from the oil separator to the crankcase of the internal combustion engine, comprising:

a drain duct connected to the crankcase of the internal combustion engine via the flange connection being provided in the module for draining the oil filter upon a replacement of the filter element, and the drain duct, the ventilation duct and the oil return duct being united in the flange connection and along at least a part of their length in the module in a single combined gas-and-oil duct, wherein the module comprises an oil cooler for cooling the lubricating oil of the internal combustion engine by means of internal combustion engine cooling water, wherein the oil cooler includes an oil drain to be enabled in case of both an oil change and upon replacement of the filter element, and wherein the oil drain leads to the combined gas-and-oil duct.

2. A module according to claim 1, wherein the module comprises one cooling water duct carrying cooling water from the internal combustion engine to the oil cooler and one cooling water duct carrying cooling water from the oil cooler to the internal combustion engine, both cooling water ducts extending through the flange connection.

3. A module according to claim 1, wherein the module comprises a lubricating oil inlet for filling lubricating oil during an oil change and refilling lubricating oil into the internal combustion engine, and wherein the lubricating oil inlet leads to the combined gas-and-oil duct.

4. A module according to claim 1, wherein the module comprises a filling connection for filling the internal combustion engine with lubricating oil for the first time, and wherein the filling connection leads to the combined gas-and-oil duct.

5. A module according to claim 1, wherein the module comprises a pressure regulating valve, positioned in a flow path of the crankcase ventilation gas cleaned in the oil separator, that is used to control the pressure present in the crankcase.

6. A module for an internal combustion engine, which module is formed as a structural unit comprising at least one oil filter for lubricating oil of the internal combustion engine and one oil separator for crankcase ventilation gas of the internal combustion engine and which, as a whole, is connected to the internal combustion engine by means of a flange connection between a module flange and an engine flange with flow connections being established, wherein an oil duct for oil to be filtered runs from the internal combustion engine to the oil filter and an oil duct for filtered oil runs from the oil filter to the internal combustion engine, wherein a ventilation duct for crankcase ventilation gas runs from the crankcase of the internal combustion engine to the oil separator and wherein an oil return duct for separated oil runs from the oil separator to the crankcase of the internal combustion engine, comprising:

a drain duct connected to the crankcase of the internal combustion engine via the flange connection being provided in the module for draining the oil filter upon a replacement of the filter element, and the drain duct, the ventilation duct and the oil return duct being united in the flange connection and along at least a part of their length in the module in a single combined gas-and-oil duct, wherein the module comprises a pressure regulating valve, positioned in a flow path of the crankcase ventilation gas cleaned in the oil separator, that is used to control the pressure present in the crankcase, and wherein the pressure regulating valve is connected to the oil separator and comprises a line connection for a gas line for crankcase ventilation gas having been deoiled in the oil separator, the gas line running to an intake section of the internal combustion engine.

7. A module according to claim 1, wherein the ducts extending through the flange connection are sealed against each other and against the environment by means of an axially sealing sealant.

8. A module according to claim 7, wherein the sealant of the flange connection is attached to the flange on the module.

9. A module according to claim 7, wherein the sealant is formed by a single, one-piece sectional seal.

10. A module according to claim 7, wherein the sealant is secured by at least one of being inserted, being clamped, being glued and being molded into one or more mounting grooves in the flange of the module.

11. A module according to claim 7, wherein the flange connection is flat at the module side and at the internal combustion engine side and the sealant is a one-piece flat seal.

12. A module for an internal combustion engine, which is formed as a structural unit comprising at least one oil filter for lubricating oil of the internal combustion engine and one oil cooler for cooling the lubricating oil by means of cooling water of the internal combustion engine and which, as a whole, is connected to the internal combustion engine by means of a flange connection between a module flange and an engine flange with flow connections being established, wherein an oil duct for oil to be filtered runs from the internal combustion engine to the oil filter and an oil duct for filtered oil runs from the oil filter to the internal combustion engine, wherein a first cooling water duct runs from the internal combustion engine to the oil cooler and wherein a second cooling water duct runs from the oil cooler to the internal combustion engine, comprising:

the module having at least one control element directing the cooling water to different flow paths of the cooling water circuit, and at least one further cooling water duct connected to at least one of the cooling water ducts and supplying cooling water to or from the control element being provided in the module.

13. A module according to claim 12, wherein at least one additional cooling water duct extends through the flange connection, the cooling water duct being in fluid communication with the control element.

14. A module according to claim 12, wherein the control element comprises a thermostat valve directing the cooling water, depending on its temperature, either into a small cooling circuit while bypassing a cooling unit cooling the cooling water or into a large cooling circuit with the cooling water flowing through the cooling unit cooling the cooling water.

15. A module according to claim 12, wherein the control element comprises an adjustable flow divider that, depending on the particular cooling requirements of the internal combustion engine, divides the cooling water coming from an internal combustion engine cylinder head and from a crankcase of the internal combustion engine into a first cooling water flow path predominantly cooling the cylinder head and a second cooling water flow path predominantly cooling the crankcase.

16. A module according to claim 12, wherein at least one water connection for a heater that can be operated with heated cooling water is provided at the module.

17. A module according to claim 12, wherein the ducts extending through the flange connection are sealed against each other and against the environment by means of an axially sealing sealant.

18. A module according to claim 17, wherein the sealant of the flange connection is attached to the flange on the module.

19. A module according to claim 17, wherein the sealant is formed by a single, one-piece sectional seal.

20. A module according to claim 17, wherein the sealant is secured by at least one of being inserted, being clamped, being glued and being molded into one or more mounting grooves in the flange of the module.

21. A module according to claim 17, wherein the flange connection is flat at the module side and at the internal combustion engine side and the sealant is a one-piece flat seal.

* * * * *